(12) United States Patent
Cheng

(10) Patent No.: US 12,721,708 B2
(45) Date of Patent: Sep. 1, 2026

(54) DUAL-PURPOSE ELECTRIC TOOTHBRUSH HEAD

(71) Applicant: Yao Cheng, Gaozhou (CN)

(72) Inventor: Yao Cheng, Gaozhou (CN)

( * ) Notice: Subject to any disclaimer, the term of this patent is extended or adjusted under 35 U.S.C. 154(b) by 0 days.

(21) Appl. No.: 19/362,447

(22) Filed: Oct. 19, 2025

(65) Prior Publication Data

US 2026/0041531 A1 Feb. 12, 2026

(51) Int. Cl.

| | |
|---|---|
| ***A61C 17/02*** | (2006.01) |
| ***A46B 5/00*** | (2006.01) |
| ***A46B 13/04*** | (2006.01) |
| ***A61C 17/22*** | (2006.01) |

(52) U.S. Cl.
CPC ........ *A61C 17/0202* (2013.01); *A46B 5/0095* (2013.01); *A46B 13/04* (2013.01); *A61C 17/222* (2013.01); *A61C 17/227* (2013.01)

(58) Field of Classification Search
CPC ... A46B 13/04; A46B 11/0062; A46B 5/0091; A46B 5/0095; A61C 17/16; A61C 17/0202; A61C 17/222; A61C 17/227
See application file for complete search history.

(56) References Cited

FOREIGN PATENT DOCUMENTS

| | | | | |
|---|---|---|---|---|
| CN | 205568226 U | * | 9/2016 | ......... A61C 17/3418 |
| KR | 20150132144 A | * | 11/2015 | ........... A61C 17/222 |

* cited by examiner

*Primary Examiner* — Jennifer C Chiang

(57) ABSTRACT

An electric toothbrush head, comprising a bristle part and a handle part, with a water chamber on the bristle part connected to a spray hole; a water flow channel is arranged inside the handle part, connecting to the water chamber; the handle part is provided with a receiving hole, which has a detent block with a guide inclined surface; a tail plug is installed in the tail hole, and a fixture slot is provided on the tail plug; a U-shaped fixture is inserted into the fixture slot. The beneficial effect of this solution lies in: simplifying the structure of the electric toothbrush head, facilitating production and use.

20 Claims, 11 Drawing Sheets

DUAL-PURPOSE ELECTRIC TOOTHBRUSH HEAD

TECHNICAL FIELD

The present disclosure relates to the field of electric toothbrushes, particularly to an electric toothbrush head.

BACKGROUND

Compared to traditional toothbrushes, electric toothbrushes have become the preferred choice for an increasing number of people due to their convenience and superior cleaning performance. However, during long-term use, the electric toothbrush head may experience internal structural wear caused by motor transmission, which not only potentially affects the user experience but also requires regular replacement by the user.

From the current market situation, existing toothbrush heads exhibit two significant issues: on one hand, their structures are generally complex, requiring higher production and assembly processes, which undoubtedly increases production difficulty and is not conducive to reducing costs; on the other hand, the complex structure also makes replacement inconvenient for users, and improper operation during replacement can easily damage the bristle components of the electric toothbrush, affecting subsequent use.

U.S. Pat. No. 11,744,690 discloses a toothbrush tip, which includes a bristle base with bristles and a nozzle, as well as a shaft body with an internal fluid channel. The shaft body is sequentially assembled with an adapter, a sealing element, and an attachment component, where the attachment component is also equipped with a retaining clip. Specifically, the adapter features a planar structure for accommodating the drive shaft and a cantilever for pressing against the drive shaft, which together secure the drive shaft. Additionally, the outer wall of the adapter includes structures such as protrusions and flanges, which are fixed to the inner wall of the shaft body through interference fit or ultrasonic welding. However, this technical solution requires the production of numerous parts and involves a complex assembly process, making it difficult to control production costs.

U.S. Pat. No. 11,730,580 discloses a dual-purpose electric toothbrush head, where the waterproof section at the end of the tail plug features a tapered inner diameter design and is made of high-density polyethylene (HDPE). Specifically, the inner diameter of the waterproof section gradually narrows, with one side of the inner wall tapering more sharply, ultimately forming an optimal arched exit at the top. Meanwhile, the bottom diameter of the waterproof section matches the diameter of the main shaft, and the hole at the top aligns with the water inlet hole on the brush handle part, enabling the tail plug to serve both sealing and positioning functions for the main shaft, thereby reducing part redundancy.

However, this design still has shortcomings: first, although the tail plug structure is simple, the process of creating an opening on the boss and installing an elastic component at the opening is relatively cumbersome, and the design of the elastic component may make it difficult to remove the main shaft. Second, the structure of the waterproof section is also somewhat complex. Therefore, whether from the perspective of reducing the burden on manufacturers or improving user experience, this technical solution is not the optimal choice.

U.S. Pat. No. 11,382,729 discloses a toothbrush head, wherein the brush handle includes a first end and a second end. The first end is formed with multiple bristle holes for securing bristles; the second end is formed with a receiving groove, which has a notch on the end face where the second end connects to the electric toothbrush. The body of the connecting piece is housed within the receiving groove, and an elastic piece is positioned on one side of the notch, elastically abutting against the side wall of the receiving groove. The drive shaft is inserted into the receiving groove through the notch and abuts against the body, thereby securing the brush head to the drive shaft. Although this design is relatively simple, the technical solution relies solely on the elastic piece abutting the side wall of the receiving groove for fixation, which has significant limitations: on one hand, during assembly, dimensional deviations in the elastic piece may prevent effective engagement with the side wall of the receiving groove; on the other hand, the static friction between the elastic piece and the side wall can significantly increase assembly resistance, not only complicating manual operation but also potentially causing deformation of the elastic piece or damage to the side wall of the receiving groove during forced assembly, compromising the connection reliability of the overall structure.

Therefore, there is an urgent market need for an electric toothbrush head with a simple structure that is easy for users to replace.

SUMMARY

The present disclosure aims to address the technical problem of overly complex structures in existing electric toothbrush heads.

To achieve the above object, the present disclosure provides the following technical solutions:

An electric toothbrush head includes a bristle part with bristles and a tubular brush handle part, wherein aside of the bristle part with the bristles is a bristle planting surface; a spray hole is provided on the bristle planting surface, and a water chamber is formed on a side of the bristle part opposite to the bristle planting surface, with the water chamber connected to the spray hole; a water inlet hole is further formed at an end of the water chamber adjacent to the brush handle part; a water flow channel extending axially is arranged inside the brush handle part, with one end of the water flow channel connected to the water chamber through the water inlet hole; a receiving hole and a tail hole are sequentially arranged at the other end of the water flow channel, with a detent block provided on an inner wall at an end of the receiving hole adjacent to the water flow channel; a length of the detent block is less than that of the receiving hole, and a guide inclined surface is provided at an end of the detent block adjacent to the tail hole; and a tubular tail plug matching the tail hole in shape is installed in the tail hole, with a fixture slot provided on a side wall of the tail plug; and a U-shaped fixture for clamping a drive shaft is inserted into the fixture slot.

The present disclosure further provides another technical solution:

An electric toothbrush head includes a bristle part equipped with bristles and a tubular brush handle part, wherein a side of the bristle part with bristles is a bristle planting surface; a spray hole is provided on the bristle planting surface, and a water chamber is formed on a side of the bristle part opposite to the bristle planting surface, with the water chamber connected to the spray hole; the bristle part further has a water inlet hole formed at an end of the water chamber adjacent to the brush handle part; a water flow channel extending axially is provided inside the brush handle part, with one end of the water flow channel connected to the water chamber through the water inlet hole and the other end equipped with a tail hole; a tubular tail plug matching the tail hole in shape is installed in the tail hole, with a fixture slot on a side wall of the tail plug; and a U-shaped fixture for clamping a drive shaft is inserted into the fixture slot; and a receiving part is further formed on an end of the tail plug adjacent to the water flow channel, with a cross-section of an inner wall of the receiving part being D-shaped.

Compared to existing technologies, the beneficial effects of the present disclosure are as follows: by integrally forming a receiving hole inside the brush handle part or providing a receiving part on the tail plug, direct coupling and fixation with the drive shaft of an electric toothbrush are achieved. This technical solution eliminates redundant components found in prior art, significantly simplifying the structure of the electric toothbrush head, reducing both the number of parts and mold development costs, and shortening the assembly process, thereby effectively lowering overall production costs. On the other hand, the direct coupling transmission method reduces cumulative tolerances and energy losses caused by multi-component connections, improving power transmission efficiency and ensuring structural stability and long-term reliability of the electric toothbrush head under high-frequency vibration conditions.

DETAILED DESCRIPTION OF THE EMBODIMENTS

Figure 1:
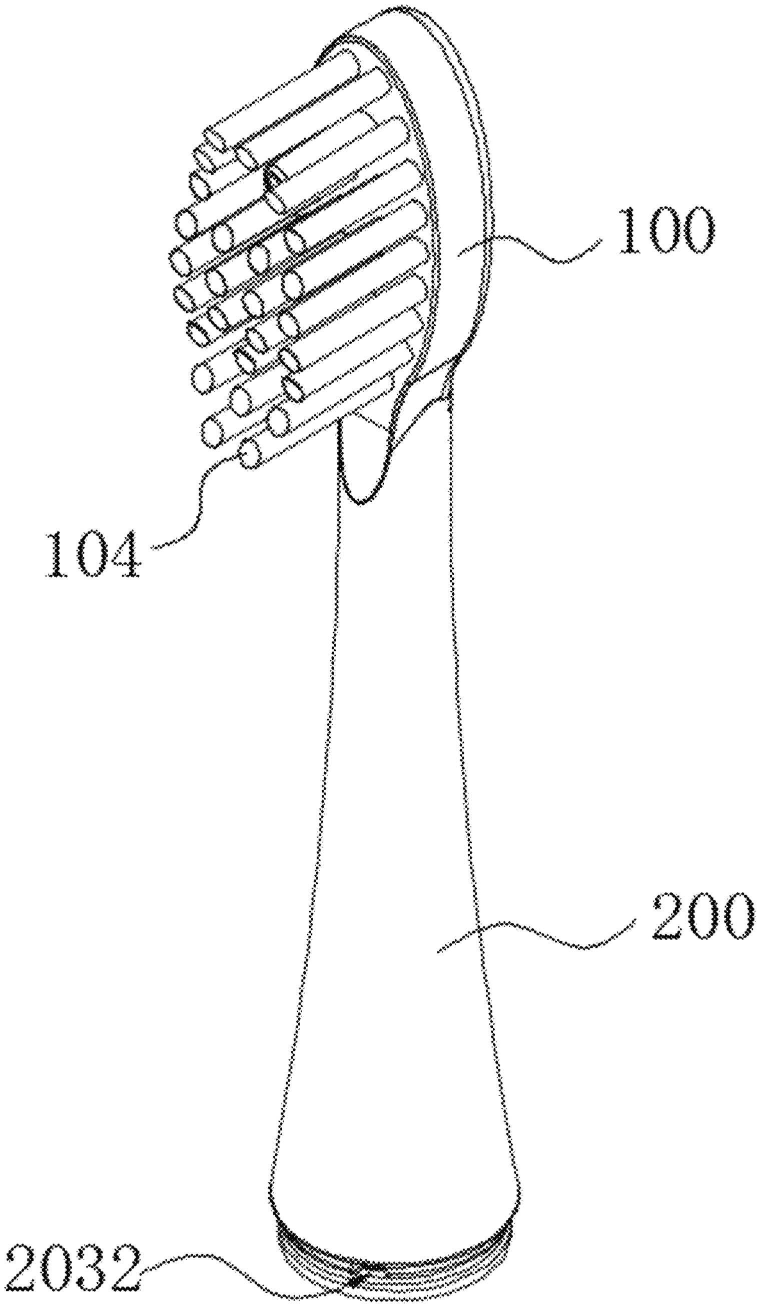
FIG. 1 is a schematic diagram of the overall structure of Embodiment 1 of the present disclosure.
Figure 2:
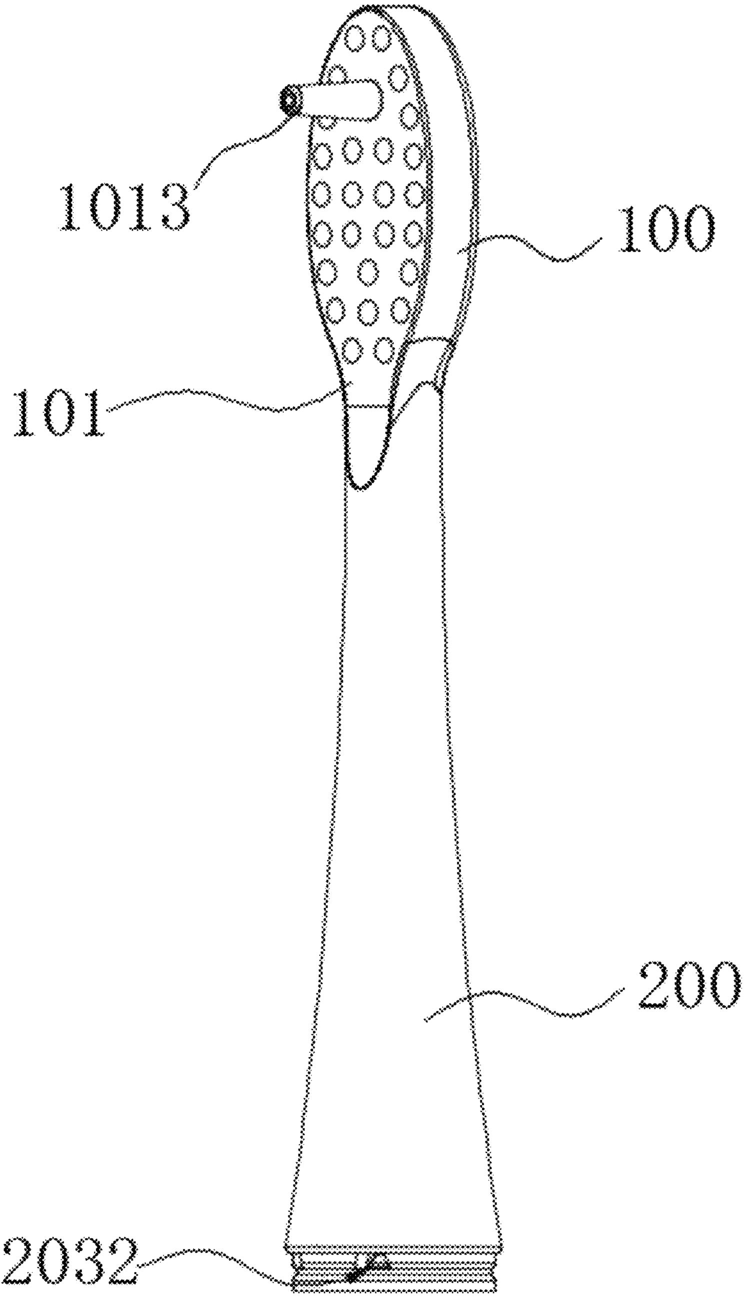
FIG. 2 is a schematic diagram of Embodiment 1 of the present disclosure with the bristles hidden.

The following provides a further detailed explanation of the present disclosure with reference to the drawings and specific embodiments.

Embodiment 1

As shown in FIGS. 1 to 4, the present disclosure discloses an electric toothbrush head, comprising a bristle part 100 provided with bristles 104 and a tubular brush handle part 200. The surface of the bristle part 100 where the bristles 104 are located is the bristle planting surface 101, and a spray hole 1011 is provided on the bristle planting surface 101. The bristle part 100 is provided with a water chamber 102 for water flow on the side opposite to the bristle planting surface 101, and the water chamber 102 remains in fluid communication with the spray hole 1011, enabling the present disclosure to provide both toothbrushing and water-flossing functions. Preferably, to rinse teeth located deep in the oral cavity, the spray hole 1011 is positioned at the end of the bristle part 100 farthest from the brush handle part 200. The bristle part 100 also forms a water inlet hole 105 at the end of the water chamber 102 adjacent to the brush handle part 200, serving as a fluid connection node between the external system and the water chamber 102 to deliver water flow into the water chamber 102.

Figure 5:
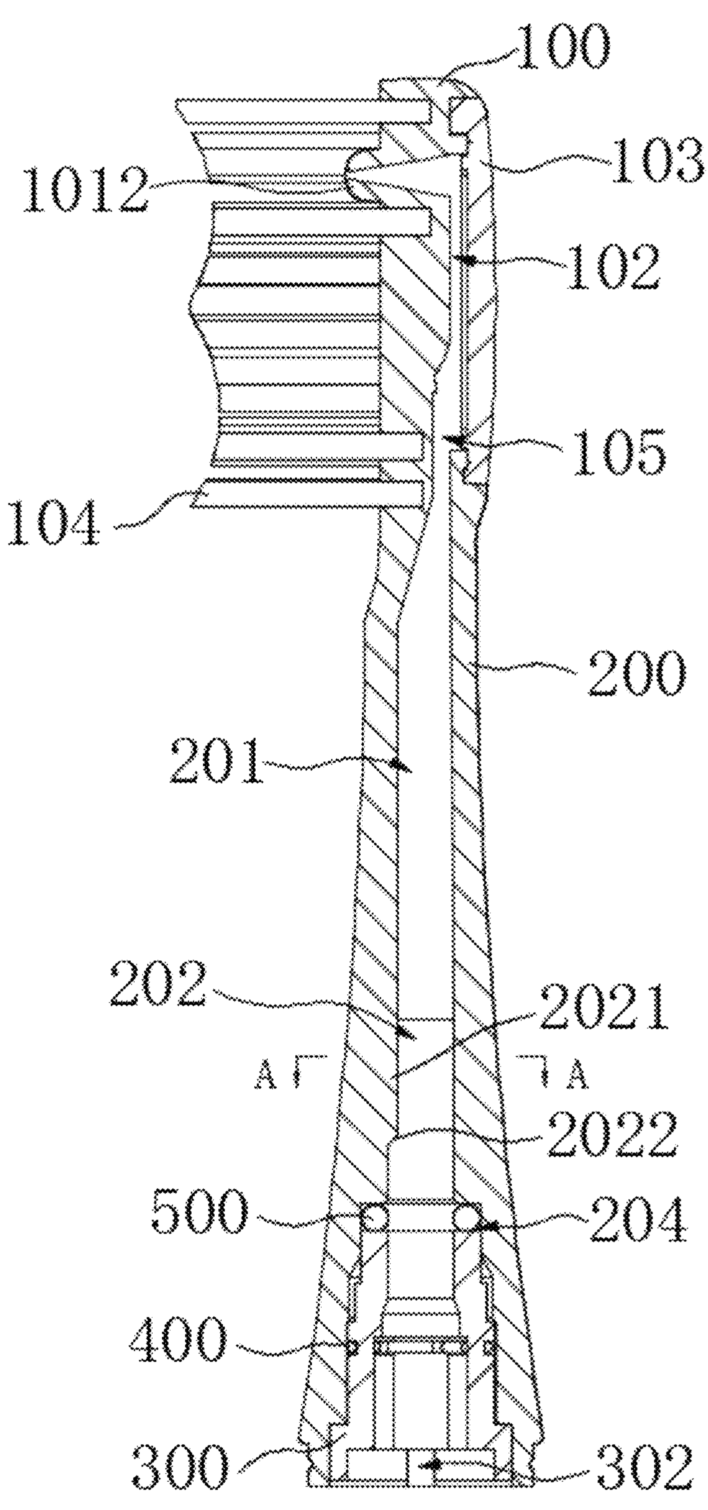
FIG. 5 is a cross-sectional view of Embodiment 1 of the present disclosure with a protrusion provided at the spray hole.

In some embodiments, to improve the rinsing effect of water flow on teeth during brushing, further modifications can be made to the spray hole 1011 of the bristle part 100. As shown in FIG. 5, the bristle planting surface 101 bulges at the locations where the spray hole 1011 is formed, creating protrusions 1012 integrated with the bristle planting surface 101, and the height of the protrusions 1012 is less than the length of the bristles 104.

The advantage of this technical solution lies in: elevating the spray hole 1011 through the protrusions 1012 reduces the distance between the spray hole 1011 and the tooth surface during use, thereby enhancing the rinsing force of the water flow on the teeth. Preferably, the height of the protrusions 1012 is set to 2 mm, a dimension that ensures rinsing effectiveness while preventing discomfort caused by direct contact between the protrusions 1012 and teeth.

Figure 4:
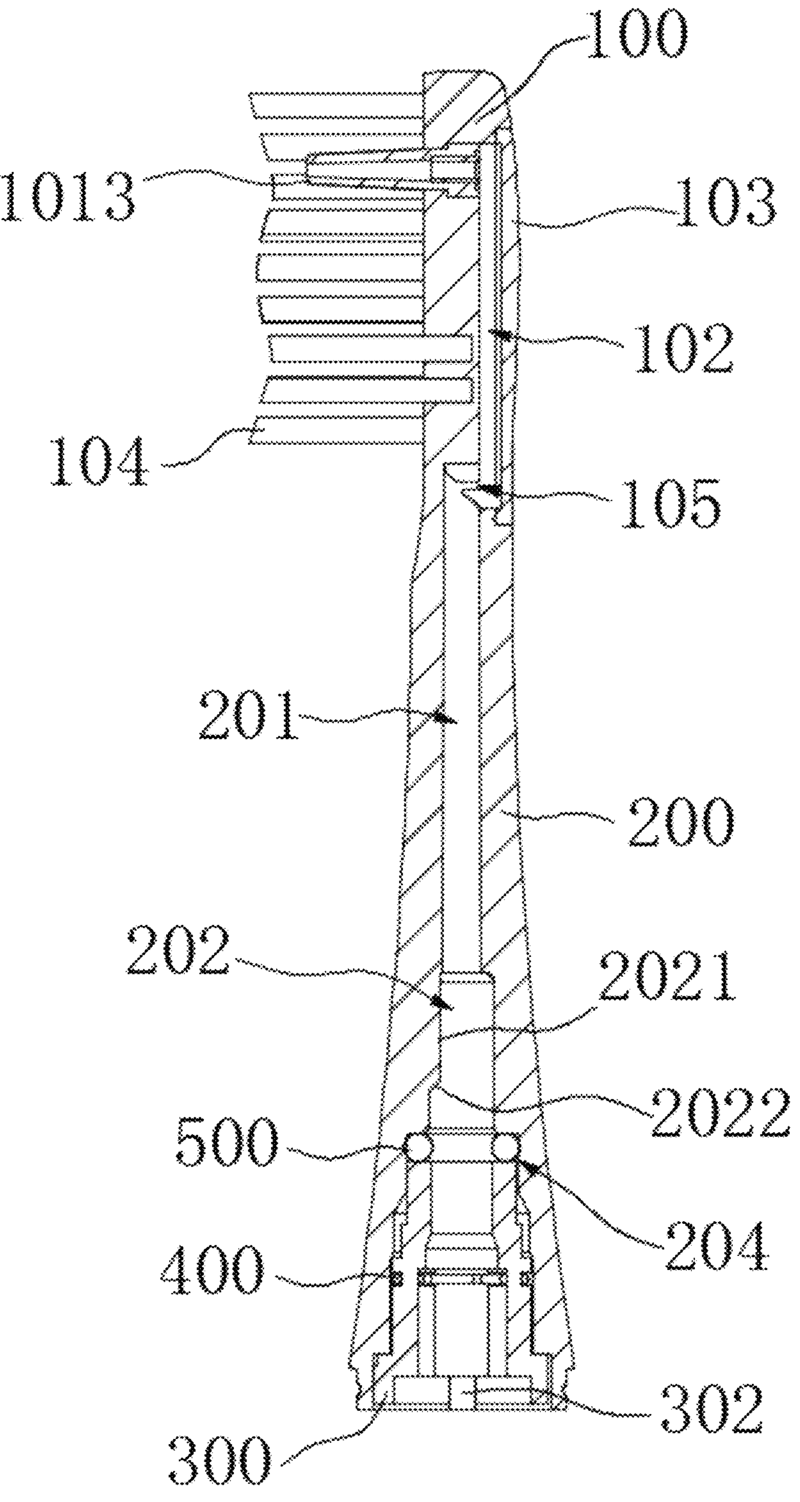
FIG. 4 is a cross-sectional view of Embodiment 1 of the present disclosure with a nozzle installed at the spray hole.

In other embodiments, as shown in FIG. 4, the spray hole 1011 of the bristle part 100 is equipped with elastic nozzles 1013. The nozzles 1013 can be fixed to the spray hole 1011 by interference fit or snap-fit, and the axial length of the nozzles 1013 is less than the length of the bristles 104. Meanwhile, the nozzles 1013 are designed with a gradually tapering structure extending away from the bristle part 100, where the radial cross-sectional radius decreases progressively from the root to the tip.

The advantage of this technical solution is that during brushing, the nozzles 1013 are closer to the teeth, shortening the water-spraying distance and ensuring the rinsing force acts more directly on the teeth. The gradually tapering structure of the nozzles 1013 creates a throttling effect on the water flow, thereby increasing the speed of the ejected water stream. Preferably, the nozzles 1013 are made of silicone, with a length of 8 mm and a tip opening of in 1 mm.

In some embodiments, the bristle part 100 adopts a split structure design instead of the traditional one-piece molding process, thereby reducing the difficulty of forming the water chamber 102.

Figure 3:
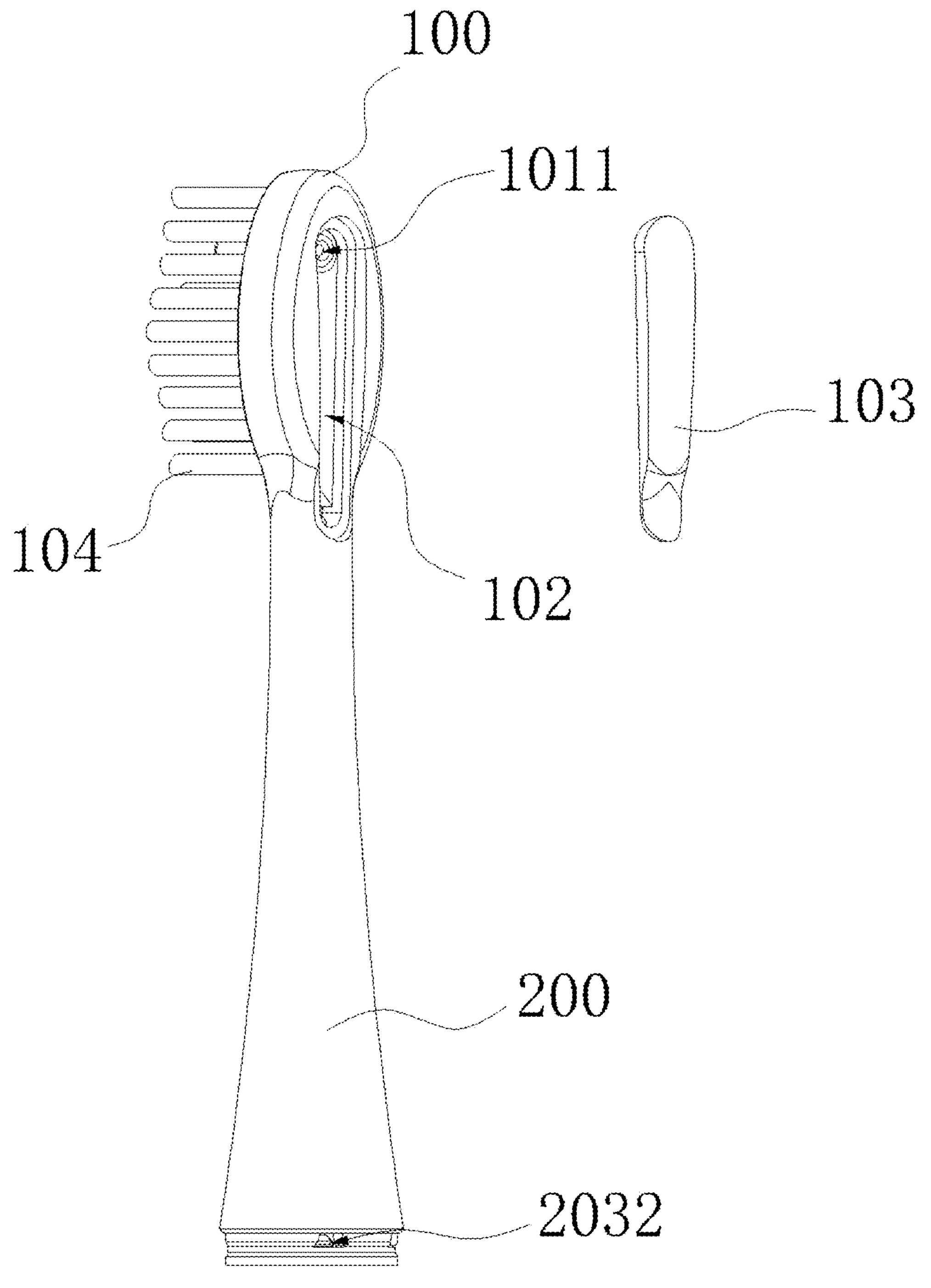
FIG. 3 is a partially exploded schematic diagram of Embodiment 1 of the present disclosure.

Specifically, as shown in FIG. 3, the side of the bristle part 100 opposite to the bristle planting surface 101 is recessed inward to form the water chamber 102. To achieve the sealing of the water chamber 102, a rear cover 103 matching the contour of the backside of the bristle part 100 is additionally provided. The size of the rear cover 103 precisely fits the edge of the water chamber 102 opening, ensuring complete closure of the water chamber 102 after covering to prevent water leakage.

In some of these embodiments, after the rear cover 103 accurately covers and seals the opening of the water chamber 102, ultrasonic welding technology can be used to fix and connect the rear cover 103 to the bristle part 100.

The brush handle part 200 is integrally formed at one end of the bristle part 100, with a water flow channel 201 inside for water passage. As shown in FIG. 4, the water flow channel 201 is arranged along the central axis of the brush handle part 200 and extends axially, forming a narrow tubular pathway. The end of the water flow channel 201 adjacent to the bristle part 100 is fluidly connected to the water chamber 102 through a water inlet hole 105, enabling the electric toothbrush head to form a complete water circuit system internally.

In some embodiments, as shown in FIG. 5, to reduce resistance during internal water flow and enhance the final ejection speed, the connection angle between the water inlet hole 105 and the water flow channel 201, as well as the connection angle between the water inlet hole 105 and the water chamber 102, are both set greater than 90°. This obtuse-angle design allows for a smoother transition of water flow at turns, reducing turbulence and thereby minimizing pressure loss, ensuring water is ejected from the spray hole 1011 with higher kinetic energy.

At the other end of the water flow channel 201, a receiving hole 202 is provided. The inner wall at the end of the receiving hole 202 adjacent to the water flow channel 201 is equipped with a detent block 2021, and the axial length of the detent block 2021 is less than the overall length of the receiving hole 202. The end of the detent block 2021 adjacent to the tail hole 203 features a guide inclined surface 2022 to facilitate the insertion and assembly of the drive shaft.

Specifically, the interior of the receiving hole 202 is a cylindrical accommodating space designed to fit the drive shaft of the electric toothbrush. To enhance the transmission stability of the drive shaft and prevent slippage during use, this solution adds an extra detent block 2021 on the inner wall of the receiving hole 202, making the cross-section of the end adjacent to the water flow channel 201 D-shaped. The detent block 2021 is engaged with the drive shaft to restrict circumferential rotation.

Figure 6:
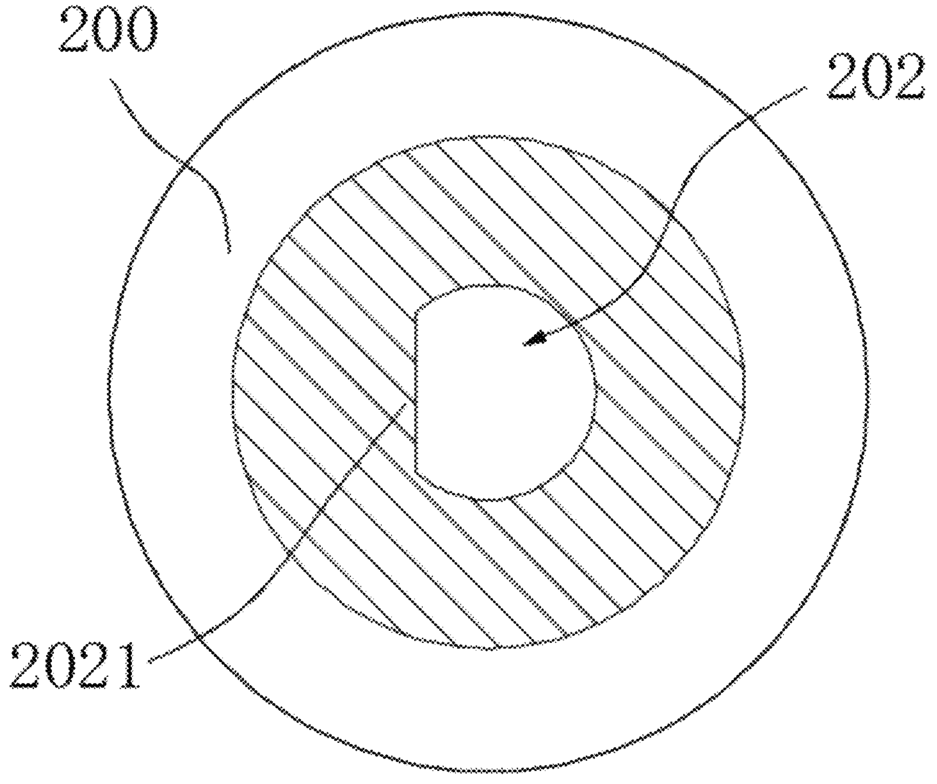
FIG. 6 is a cross-sectional view along the A-A plane in FIG. 5.

In some embodiments, as shown in FIG. 6, after adding the detent block 2021, the cross-section of the receiving hole 202 is designed as a superior arc shape. This structure maximizes the internal flow space of the receiving hole 202 while ensuring the detent function, thereby increasing water flow throughput.

In other embodiments, the detent block 2021 is directionally arranged on the side of the receiving hole 202's inner wall that aligns with the bristle 104's orientation: when the electric toothbrush head is fully assembled, the directional structure of the detent block 2021 ensures the bristle 104 and the body's buttons face the same direction, improving operational convenience and grip comfort during use.

The tail hole 203 is located at the end of the brush handle part 200, and a tubular tail plug 300 is assembled inside it. The contour of the tail plug 300 matches the shape of the tail hole 203's inner wall to ensure a high degree of fit. As shown in FIG. 4, a positioning block 2031 is integrally formed on the inner wall of the tail hole 203. This positioning block 2031 serves to position the tail plug 300 during installation, clarifying its reference position and preventing assembly misalignment. It also restricts the circumferential rotation of the tail plug 300 within the tail hole 203 through structural engagement, preventing slippage during use. Correspondingly, the side wall of the tail plug 300 is provided with a positioning groove 302 that matches the size and shape of the positioning block 2031. When the tail plug 300 is installed into the tail hole 203, the positioning block 2031 precisely embeds into the positioning groove 302, strictly defining the assembly posture of the tail plug 300 and the tail hole 203 through their interlocking fit, ensuring the tail plug 300 does not twist or misalign relative to the tail hole 203.

In some embodiments, to further enhance anti-slip effects and assembly stability, the number of positioning blocks 2031 on the inner wall of the tail hole 203 can be set to two or more. Simultaneously, the same number and correspondingly positioned positioning grooves 302 are provided on the side wall of the tail plug 300, enabling multiple sets of positioning structures to work in sync. This disperses the forces acting on the tail plug 300 during rotation, preventing excessive wear or failure of a single positioning structure, thereby extending the service life of the assembly structure.

To achieve the tight assembly of the tail plug 300 and the tail hole 203, the inner wall of the tail hole 203 is pre-equipped with a fixing hole 2032 for limiting purposes, while the outer wall of the tail plug 300 is integrally formed with a fixing block 303 that matches the fixing hole 2032, forming an interference-fit axial locking structure. During the installation of the tail plug 300, after the initial assembly is completed along the axial direction of the tail hole 203, continued axial pressing force is applied to cause elastic deformation of the fixing block 303 on the side wall of the tail plug 300, which then squeezes into the fixing hole 2032 of the tail hole 203. Once the fixing block 303 is fully embedded in the fixing hole 2032, its elastic deformation recovers, creating a mechanical interlock with the fixing hole 2032. This establishes an axial anti-disengagement constraint, effectively preventing the tail plug 300 from loosening within the tail hole 203 during use and ensuring long-term stability of the assembly structure.

In some embodiments, to further enhance the axial locking effect and distribute the load on a single set of structures, a multi-group symmetric fixing structure design can be adopted: two or more fixing blocks 303 are arranged on the outer wall of the tail plug 300, while corresponding fixing slots of equal quantity and in the same phase are machined on the inner wall of the tail hole 203. During assembly, multiple groups of fixing blocks 303 and fixing slots simultaneously complete the fit, achieving multi-point cooperative locking. This significantly improves the bonding strength between the tail plug 300 and the tail hole 203, preventing wear or failure of a single fixing structure due to long-term axial tension and extending the service life of the overall assembly structure.

Figure 7:
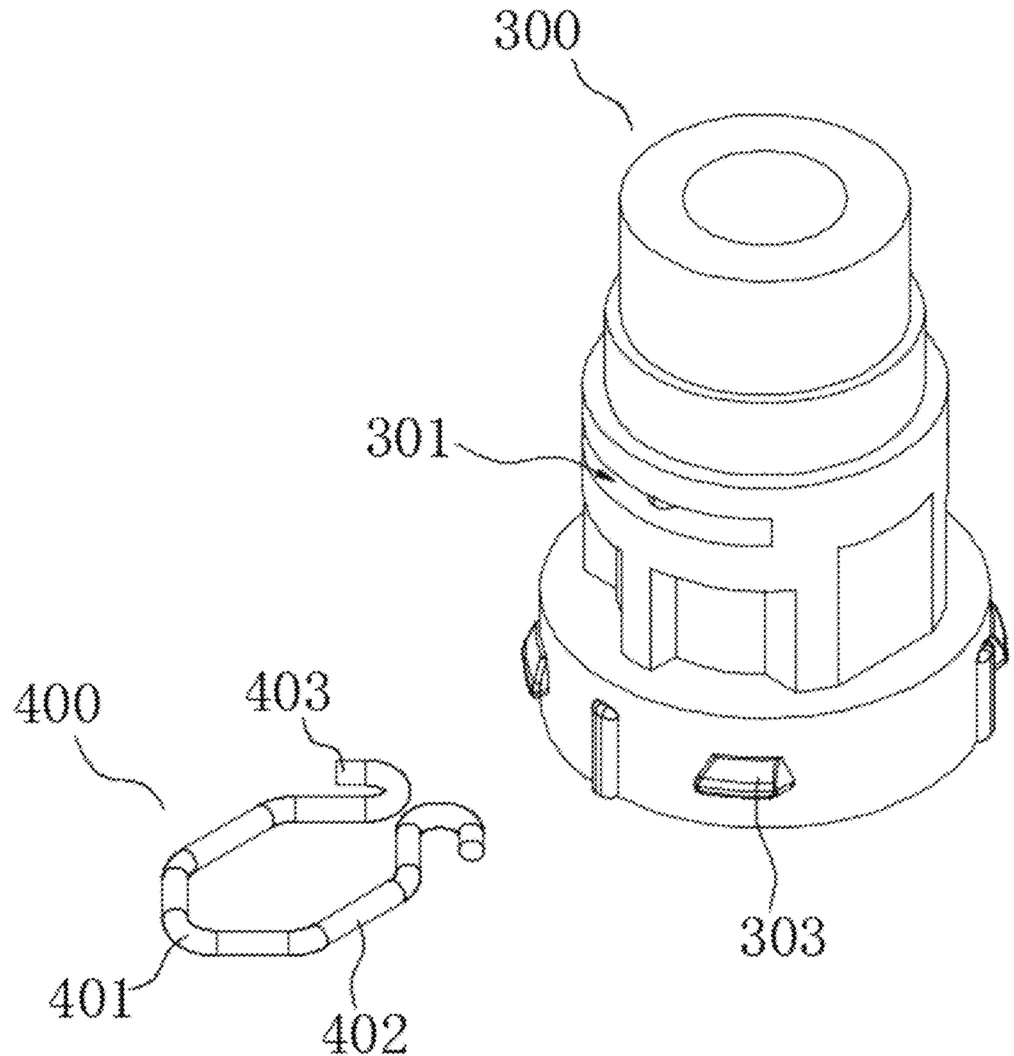
FIG. 7 is a schematic diagram of the tail plug and U-shaped fixture in Embodiment 1 of the present disclosure.
Figure 8:
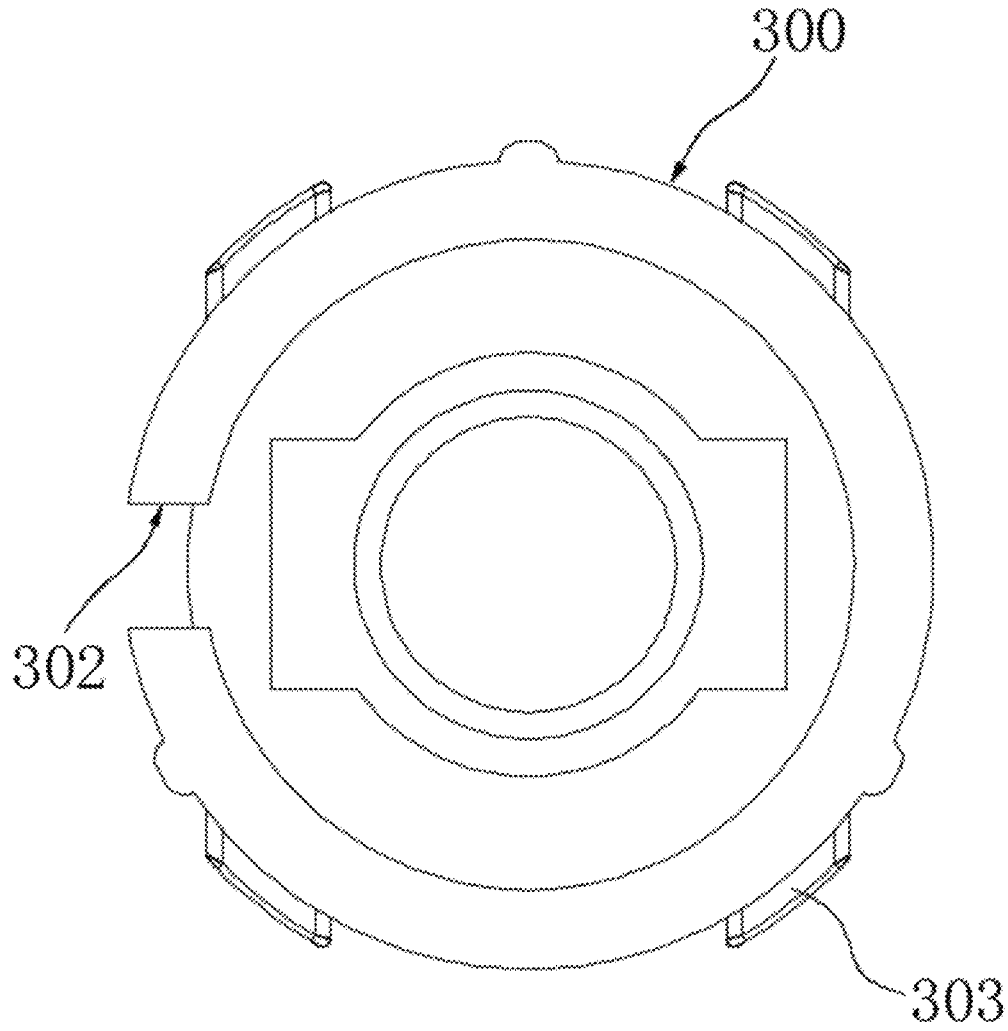
FIG. 8 is a bottom view of the tail plug in Embodiment 1 of the present disclosure.
Figure 9:
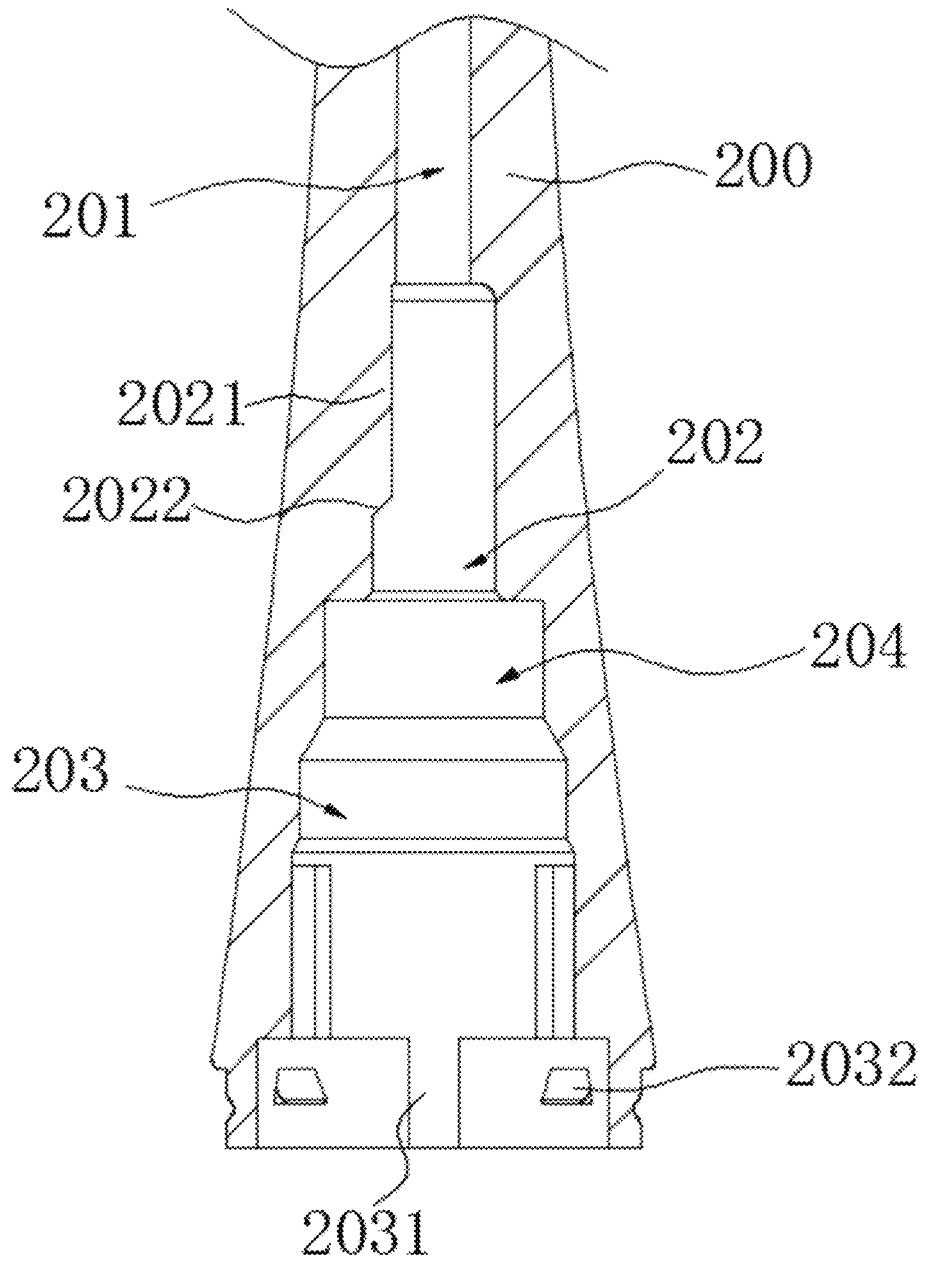
FIG. 9 is a cross-sectional view of the tail hole in Embodiment 1 of the present disclosure.
Figure 10:
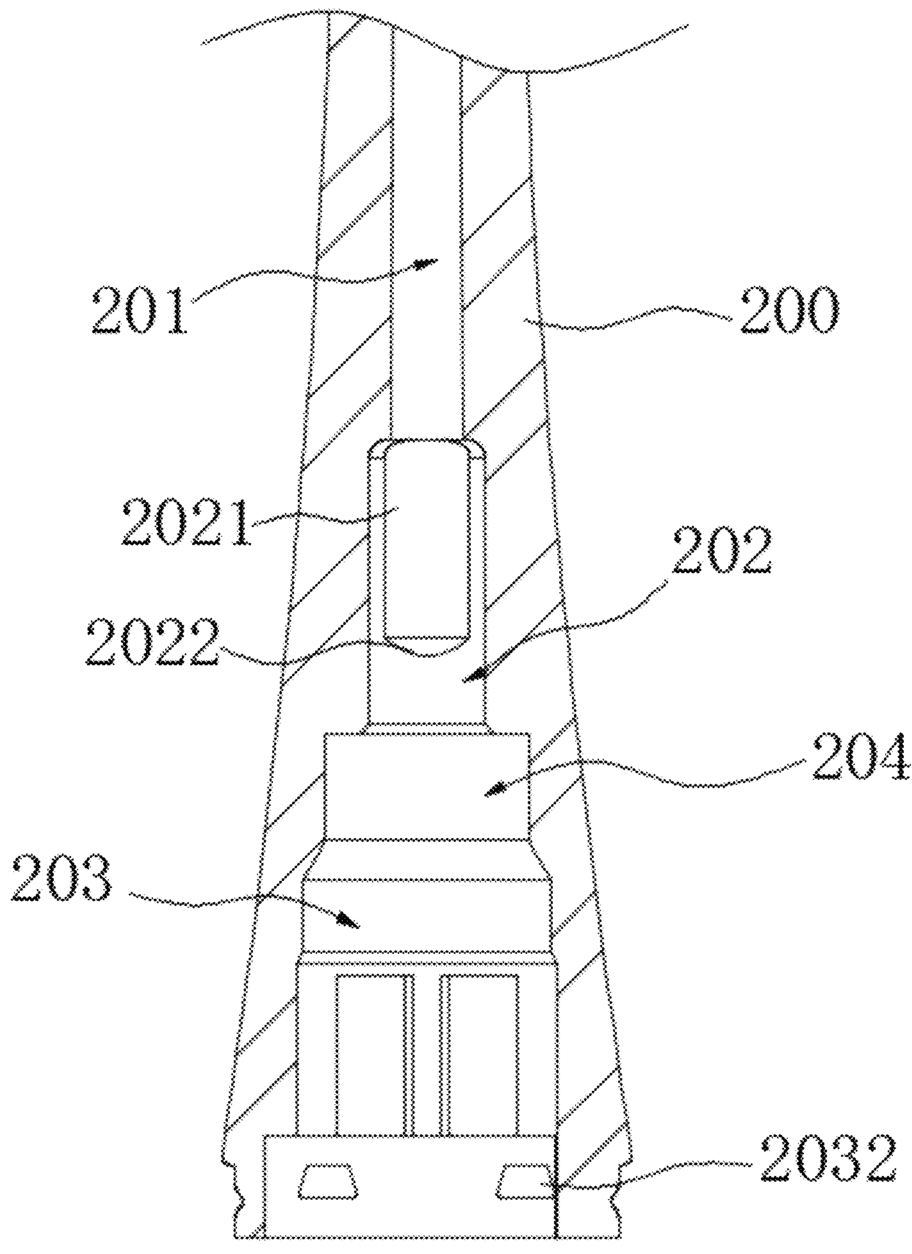
FIG. 10 is a cross-sectional view of another section of the tail hole in Embodiment 1 of the present disclosure.

A fixture slot 301 is provided on the side wall of the tail plug 300 for assembling a fixture to achieve clamping and fixing of the electric toothbrush's drive shaft. Specifically, as shown in FIG. 7, the adapted fixture adopts a U-shaped structural design, with one end being an arc-shaped fixture arch 401 and the other end being a fixture tail 403. The fixture tail 403 and fixture arch 401 are connected through a pair of parallel fixture arms 402, forming a complete clamping framework.

The matching fixture slot 301 consists of four through-holes on the sidewall of the tail plug 300. These through-holes are coplanar, with their diameters and spacing matching the diameter and arm spacing of the fixture arms 402 of the U-shaped fixture 400. This ensures the two fixture arms 402 of the fixture can respectively pass through the corresponding through-holes on the sidewall of the tail plug 300, achieving stable insertion of the fixture onto the tail plug 300 and forming a reliable grip on the drive shaft through the fixture arch 401. When the U-shaped fixture 400 is inserted into the tail plug 300, its two fixture arms 402 traverse horizontally inside the tail plug 300, creating radial clamping constraints on the drive shaft. Meanwhile, the fixture tail 403 and fixture arch 401 of the fixture fit into the corresponding slots of the tail plug 300, achieving axial and circumferential positioning through contact with the sidewall of the tail plug 300. This forms a complete positioning system, minimizing loosening displacement of the U-shaped fixture 400 on the tail plug 300 and ensuring stable clamping of the drive shaft.

In some embodiments, a transitional sealing hole 204 is provided between the receiving hole 202 and the tail hole 203. A sealing ring 500 is provided in the sealing hole 204 by interference fit, forming a radial sealing structure. This design effectively blocks water in the water flow channel 201 from backflowing and leaking through gaps by ensuring tight contact between the sealing ring 500 and the inner wall of the sealing hole 204, thereby maintaining the sealing integrity of the waterway system. In some of these embodiments, the sealing ring 500 is made of silicone.

This embodiment achieves direct coupling between the toothbrush head and the electric toothbrush drive shaft by integrally molding the receiving hole inside the brush handle part 200. This technical solution eliminates redundant components found in prior art, significantly simplifying the structure of the electric toothbrush head. It not only reduces the number of parts and mold development costs but also shortens the assembly process, effectively lowering production costs. On the other hand, the direct coupling transmission method minimizes cumulative tolerances and energy losses caused by multi-component connections, improving power transmission efficiency and ensuring the structural stability and long-term reliability of the electric toothbrush head under high-frequency vibration conditions.

Embodiment 2

Figure 11:
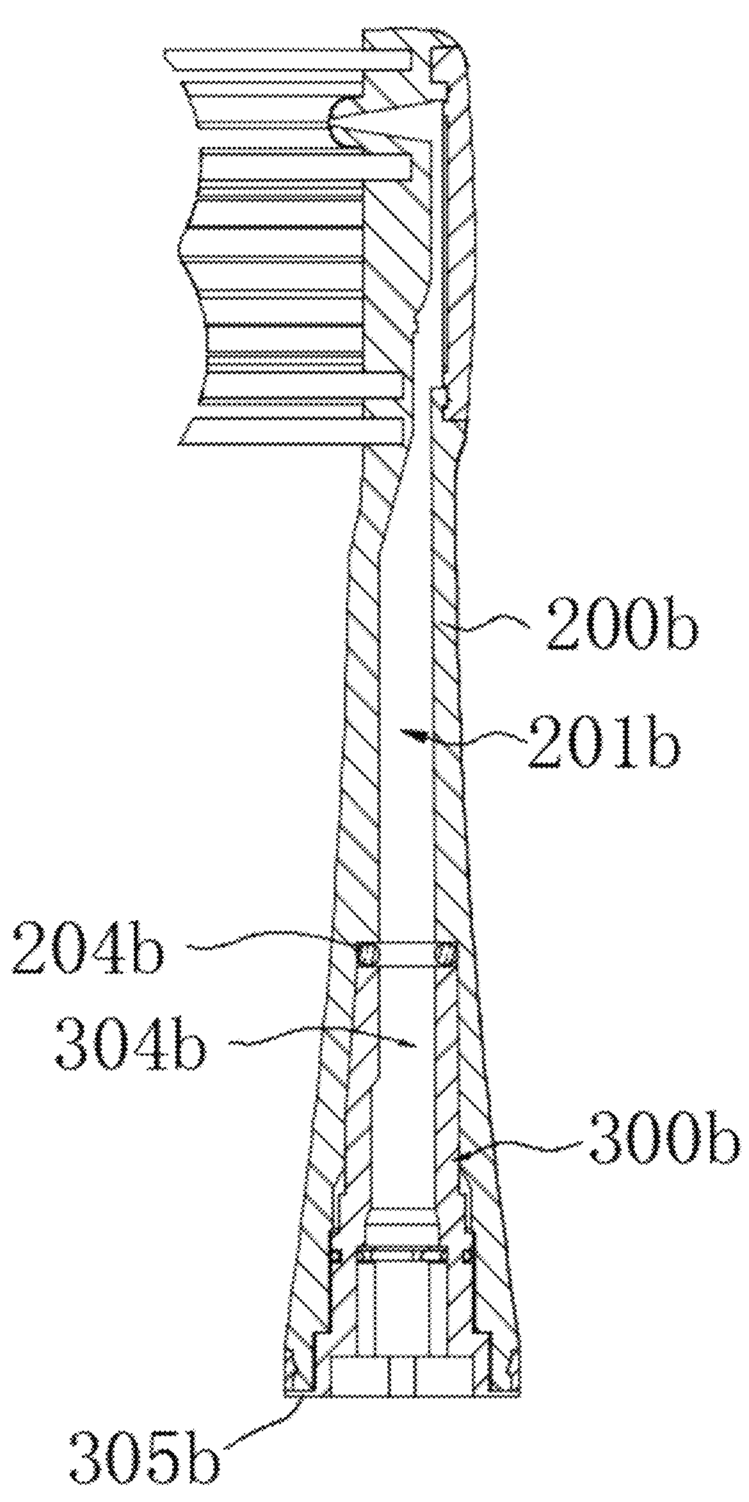
FIG. 11 is a cross-sectional view of Embodiment 2 of the present disclosure.

The structure of this solution is basically the same as that of Embodiment 1, with the difference being: as shown in FIG. 11, no receiving hole is provided in the brush handle part 200*b*, and the water flow channel 201*b* is directly connected to the sealing hole 204*b*; correspondingly, the tail plug 300*b* has a longer structure and forms an interference fit with the tail hole when installed. A receiving part 304*b* is formed in the tail plug 300*b* at an end adjacent to the water flow channel 201*b*, and the inner wall of the receiving part 304*b* has a D-shaped cross-section to achieve connection with the drive shaft. Meanwhile, to reduce assembly difficulty, in some embodiments, the tail plug 300*b* extends radially at the end away from the drive part to form a retaining ring 305*b*, so that when the tail plug 300*b* is assembled into the tail hole, the retaining ring 305*b* presses against the end of the brush handle part 200*b*. This allows for better control of the installation position of the tail plug 300*b* during assembly, and the retaining ring 305*b* can also cover the assembly gap on the end face of the brush handle part 200*b*, making the toothbrush head more aesthetically pleasing.

This embodiment achieves direct coupling and fixation with the drive shaft of an electric toothbrush by providing a receiving part on the tail plug 300*b*. This technical solution eliminates redundant components found in prior art, significantly simplifies the structure of the electric toothbrush head, reduces the number of parts and mold development costs, and shortens the assembly process, thereby effectively lowering production costs.

What is claimed is:

1. An electric toothbrush head, comprising a bristle part with bristles and a tubular brush handle part, wherein aside of the bristle part with the bristles is a bristle planting surface;

a spray hole is provided on the bristle planting surface, and a water chamber is formed on a side of the bristle part opposite to the bristle planting surface, with the water chamber connected to the spray hole; a water inlet hole is further formed at an end of the water chamber adjacent to the brush handle part;

a water flow channel extending axially is arranged inside the brush handle part, with one end of the water flow channel connected to the water chamber through the water inlet hole;

a receiving hole and a tail hole are sequentially arranged at the other end of the water flow channel, with a detent block provided on an inner wall at an end of the receiving hole adjacent to the water flow channel; a length of the detent block is less than that of the receiving hole, and a guide inclined surface is provided at an end of the detent block adjacent to the tail hole; and a tubular tail plug matching the tail hole in shape is installed in the tail hole, with a fixture slot provided on a side wall of the tail plug; and a U-shaped fixture for clamping a drive shaft is inserted into the fixture slot.

2. The electric toothbrush head according to claim 1, wherein one end of the U-shaped fixture is provided with an arched fixture arch, and the other end is provided with a fixture tail, with the fixture tail and the fixture arch connected by a pair of parallel fixture arms.

3. The electric toothbrush head according to claim 1, wherein at least one positioning block and at least one fixing hole are provided on an inner wall of the tail hole; and at least one positioning groove engagable with the positioning block and at least one fixing block engagable with the fixing hole are provided on the tail plug.

4. The electric toothbrush head according to claim 1, wherein a sealing hole is further arranged between the receiving hole and the tail hole, with a sealing ring installed in the sealing hole by interference fit; and the sealing ring is made of silicone.

5. The electric toothbrush head according to claim 1, wherein the spray hole is formed at an end of the bristle part away from the brush handle part.

6. The electric toothbrush head according to claim 5, wherein the bristle planting surface bulges at a position where the spray hole is formed to form a protrusion, and a height of the protrusion is less than a length of the bristles.

7. The electric toothbrush head according to claim 5, wherein a flexible nozzle is installed in the spray hole, with the nozzle gradually tapering in diameter away from the bristle part; and a length of the nozzle is less than that of the bristles.

8. The electric toothbrush head according to claim 1, wherein an angle between the water inlet hole and the water flow channel, as well as an angle between the water inlet hole and the water chamber, is greater than 90°, meaning that the water inlet hole is connected obliquely to the water flow channel and the water chamber.

9. The electric toothbrush head according to claim 1, wherein a rear cover is provided on the bristle part to seal the water chamber, with a shape of the rear cover matching that of the bristle part.

10. The electric toothbrush head according to claim 9, wherein the rear cover and the water chamber are connected by ultrasonic welding.

11. An electric toothbrush head, comprising a bristle part equipped with bristles and a tubular brush handle part, wherein a side of the bristle part with bristles is a bristle planting surface;

a spray hole is provided on the bristle planting surface, and a water chamber is formed on a side of the bristle part opposite to the bristle planting surface, with the water chamber connected to the spray hole; the bristle part further has a water inlet hole formed at an end of the water chamber adjacent to the brush handle part;

a water flow channel extending axially is provided inside the brush handle part, with one end of the water flow channel connected to the water chamber through the water inlet hole and the other end equipped with a tail hole;

a tubular tail plug matching the tail hole in shape is installed in the tail hole, with a fixture slot on a side wall of the tail plug; and a U-shaped fixture for clamping a drive shaft is inserted into the fixture slot; and a receiving part is further formed on an end of the tail plug adjacent to the water flow channel, with a cross-section of an inner wall of the receiving part being D-shaped.

12. The electric toothbrush head according to claim 11, wherein one end of the U-shaped fixture is provided with an arched fixture arch, and the other end is provided with a fixture tail, with the fixture tail and the fixture arch connected by a pair of parallel fixture arms.

13. The electric toothbrush head according to claim 11, wherein a retaining ring is formed at an end of the tail plug away from the receiving part, and when the tail plug is installed in the tail hole, the retaining ring abuts against an edge of an end of the brush handle part; and at least one positioning block and at least one fixing hole are provided on an inner wall of the tail hole; the tail plug has at least one positioning groove engagable with the positioning block and at least one fixing block engagable with the fixing hole.

14. The electric toothbrush head according to claim 11, wherein a sealing hole is provided between the water flow channel and the tail hole, with a sealing ring installed by interference fit; and the sealing ring is made of silicone.

15. The electric toothbrush head according to claim 11, wherein the spray hole is formed at an end of the bristle part away from the brush handle part.

16. The electric toothbrush head according to claim 15, wherein the bristle planting surface bulges at a position where the spray hole is formed to form a protrusion, and a height of the protrusion is less than a length of the bristles.

17. The electric toothbrush head according to claim 15, wherein a flexible nozzle is installed in the spray hole, with the nozzle gradually tapering in diameter away from the bristle part; and a length of the nozzle is less than that of the bristles.

18. The electric toothbrush head according to claim 11, wherein an angle between the water inlet hole and the water flow channel, and an angle between the water inlet hole and the water chamber are both greater than 90°, meaning that the water inlet hole is connected obliquely to the water flow channel and the water chamber.

19. The electric toothbrush head according to claim 18, wherein a rear cover is provided on the bristle part to seal the water chamber, with a shape of the rear cover matching that of the bristle part.

20. The electric toothbrush head according to claim 19, wherein the rear cover and the water chamber are connected by ultrasonic welding.

* * * * *